A. B. WILSON.
Sewing Machine.
No. 346.
Reissued Jan'y 22, 1856.
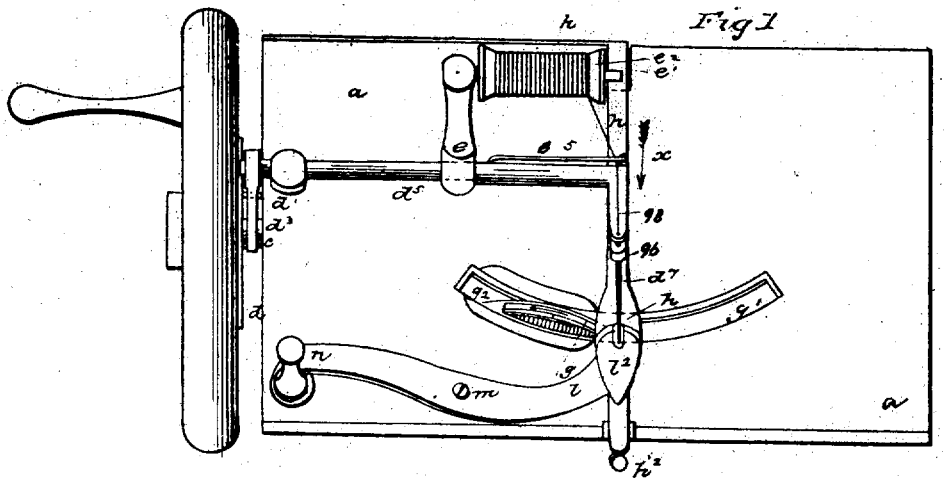
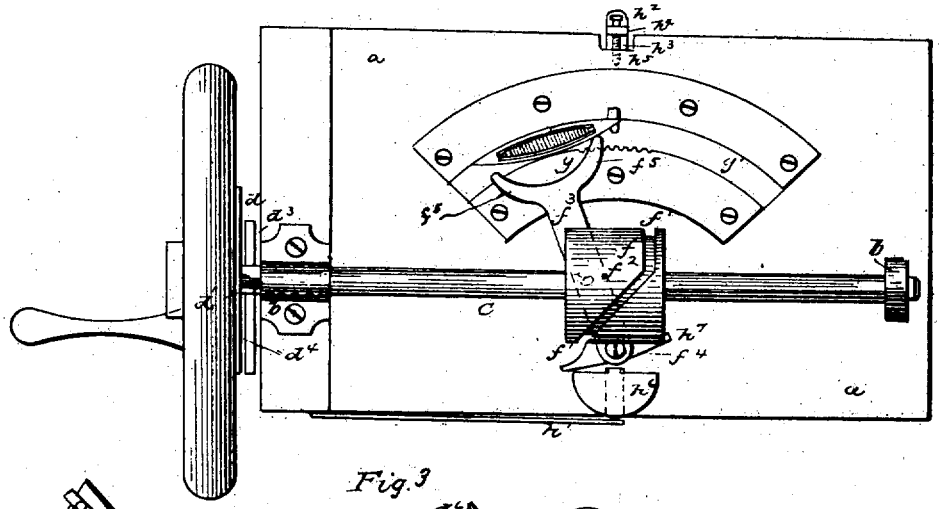
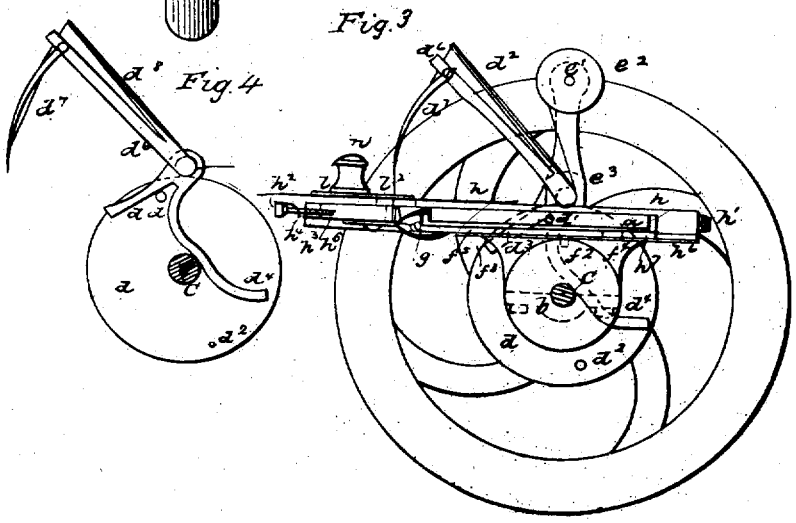

UNITED STATES PATENT OFFICE.

ALLEN B. WILSON, OF PITTSFIELD, MASSACHUSETTS.

IMPROVEMENT IN SEWING-MACHINES.

Specification forming part of Letters Patent No. 7,776, dated November 12, 1850; Reissue No. 346, dated January 22, 1856.

*To all whom it may concern:*

Be it known that I, A. B. WILSON, of Pittsfield, Berkshire county, Massachusetts, have invented a new and useful Method of Feeding the Cloth or Material to be Sewed in Machines for Sewing; and I do hereby declare that the following specification, taken in connection with the drawings, is a full, clear, and exact description thereof.

In the drawings, Figure 1 is a perspective view of the machine from the upper side thereof. Fig. 2 is a plan of the bottom of the machine. Fig. 3 is a vertical section through the machine in the plane of the needle-carrier, and Fig. 4 is a detail view of the operating mechanism of the needle.

The same letters refer to the same parts in all the figures.

Prior to the date of my invention numerous sewing-machines have been devised and applied to use. In some of these machines the material to be sewed or embroidered has been advanced under the needle or sewing apparatus proper by the hand of an operator, the material resting upon or against a table or support. In other machines the material has been secured upon a "basting-plate," technically so termed, by means of pins or nippers, or some similar contrivance, and this plate received a regular progressive motion through the agency of suitable machinery. In the former class of machines the material could be turned and twisted at will, so that there was no difficulty in sewing seams of any reasonable curvature; but there was no guarantee for any regularity of stitch, except the care and skill of the operator, and this, at best, is far inferior to the precision attained by the action of machinery. In the latter class the regularity of stitch depended wholly upon precision of mechanical construction, and the stitch was, practically speaking, uniform in length under any given adjustment of the apparatus; but the basting-plate hampered the free motion of the cloth, prevented its being turned, and reduced the capabilities of the machine, preventing it from sewing seams of any considerable degree of curvature. The attachment of the cloth to the basting-plate, moreover, required time, and thus reduced the actual performance of the machine. These difficulties have impeded the introduction of sewing-machines to the extent that their merits in other respects demand; and the object of my invention is to remedy and obviate the difficulties incident both to a hand-feed or that derived from a baster-plate, retaining at the same time the good features of both of them.

To this end the nature of the first part of my invention consists in causing the cloth or material to be sewed or embroidered to progress regularly by the action of the surfaces between which it is clamped, substantially in the manner and for the purposes hereinafter set forth; and the nature of the second part of my invention consists in holding the cloth in place by means of a needle, or some equivalent thereof, at the proper time, in combination with feeding-surfaces, the whole acting substantially as hereinafter specified; and the nature of the third part of my invention consists in arranging the surfaces which cause the cloth to progress in such manner in relation to a needle that they or one of them shall also perform the duty of stripping the cloth or substance to be sewed from the needle, as herein set forth. The nature of the fourth part of my invention consists in so mounting and attaching one of the surfaces which clamp the cloth and cause it to progress that such surface may be moved away from its fellow for the purpose of introducing or removing cloth or other material, substantially in the manner herein described.

As it is more convenient to describe my invention by reference to a sewing-machine as a whole, I have represented in the drawings and refer in this specification to a sewing-machine lately invented by myself to which my invention is represented as applied; but I do so for the purpose of exemplification merely, as my invention is applicable to various sewing and embroidering machines, with or without change of arrangement or alteration of the mechanical devices or trains of mechanism which give motion to the ultimate or really acting parts of my contrivance, it being in these latter, which act immediately upon the cloth, that my invention is formed and consists.

In the drawings is represented a shuttle-machine whose bed-plate *a* has attached to it proper journal-boxes *b b*, in which is secured a shaft, *c*, provided at one end with a crank and fly-wheel, and also with a pin-wheel, *d*, and a cam, $f$, the former communicating motion to the needle, the latter to the shuttle and feed-motions. The wheel $d$ has projecting from its face two small pins, $d'$ $d^2$, which act alternately upon two arms, $d^3$ $d^4$, of a species of escapement, and thereby communicate an oscillating motion to the rock-shaft $d^5$, to which these arms are secured. This shaft is mounted in proper journals upon the bed-plate, and carries a needle bar or stalk, $d^6$, upon whose back is fastened a spring, $d^8$, while the needle itself, $d^7$, is attached to this bar in any suitable manner. This needle is curved, is provided with an eye near its point, and is also slightly grooved on its convex side, so as to guide the thread.

Upon the bed-plate is mounted a standard, $e$, supporting an axis, $e'$, upon which is mounted a bobbin, $e^2$, containing thread, whose end is carried under a guide, $e^3$, afterward through a hole in a take-up and let-off spring, $d^8$, then through an apparatus on the needle-carrier, and finally through the eye of the needle itself. As the driving-shaft revolves, the needle reciprocates, passing back and forth through the material to be sewed.

The cam $f$, before referred to, has formed upon its surface a grooved track or pinway, $f'$, in which rests a pin, $f^2$, projecting from a small lever, $f^3$, pivoted at $f^4$, under the bed-plate of the machine. This track is so formed as to alternately move and stop the lever $f^3$, so that it vibrates in one direction when the needle is in the cloth, then pauses while the needle is out of the cloth, returns in the opposite direction when the needle is again through the cloth, and then pauses a second time. Upon one end of this lever are two jaws, $f^5$ $f^6$, which alternately act upon the shuttle $g$, and thus throw it back and forth in its race $g'$. This shuttle carries a bobbin of thread, as usual, is pointed at both ends, and has an eye or guide for the thread. In the action of the machine the needle enters the cloth, passes through it, and commences to rise and spread a loop of thread, which the point of the shuttle enters and spreads, passing through it and leaving its thread in the loop. The needle then ascends, re-enters the cloth, and the same action takes place again, except that the shuttle enters from the opposite side. The shuttle-thread is thus zigzagged through the loops of the needle-thread, and the stitch is less liable to ravel than the ordinary shuttle-stitch.

Upon the bed-plate of the machine is located a sliding bar, $h$, having a roughened surface on its upper side, near one of its ends. It is pressed in the direction of the arrow $x$ by a spring, $h'$, secured to the bed-plate, the length of throw of this spring being limited by the head $h^2$ of a screw, $h^3$, which passes through a projection, $h^4$, on the sliding bar, and may be screwed to a greater or less extent into the bed-plate at $h^5$. To this sliding bar, and below the bed-plate, is fastened a foot or cross, $h^6$, upon whose face act vibrating toes $h^7$ $h^7$, forming part of the lever $f^3$. As this lever vibrates, its toes, acting upon the foot alternately, will move the sliding bar in a direction opposite to that of arrow $x$, and the spring $h'$ will return the bar in the opposite direction as soon as the toes permit. This sliding bar will therefore reciprocate to and fro once during each stroke of the needle, the extent of its motion being governed by the set-screw $h^3$. Upon this sliding or reciprocating surface the cloth or material to be sewed is laid, and it is clear would, if this were the whole of the contrivance, be but slightly affected by its vibrations. In order, therefore, to move the cloth, there is applied to the surface before described another surface, $l^2$, mounted upon a spring-lever, $l$, the whole constituting a species of clamp-jaw, by which the cloth or material to be sewed is, during the action of the machine, held upon the roughened surfaces before described. The surface $l^2$ is mounted upon a spring, in order that the surfaces may grasp between them different thicknesses of material, and also in order that the roughened surface may more readily move in any direction without moving the cloth. Now, in the action of these surfaces the material to be sewed is held still by the needle and by its friction upon the bed-plate, while the lower surface moves in the direction of arrow $x$; but when the needle has risen free from the cloth, the lower surface moves in the opposite direction and draws with it the cloth, which is held in firm contact with its roughened end by means of the comparatively smooth upper surface. In order to make this operation certain, the lower surface should be roughened by small teeth, like saw-teeth, which, when moved in one direction, slip under without moving the cloth, but when moved in the other direction catch the material on their points and force it to traverse with them. By inspection of the drawings it will be perceived that these surfaces are arranged in close proximity to the points where the needle enters the cloth, holes or notches $o$ $o'$ being pierced through them to give it free passage. The upper surface therefore strips the cloth off the needle as it rises, thus obviating the necessity of a separate apparatus for that purpose.

As it is necessary to remove and replace the cloth with convenience, the spring-lever which carries the upper surface is pivoted at $m$ and prolonged, having at its extremity a handle, $n$, and also a locking-pin, or some similar contrivance, to hold the lever in such position that the upper surface shall lie over the lower one. When it is required to enter or remove cloth, the pin is loosened and the upper surface is turned away from the lower one until the object is effected.

The length of stitch depends upon the amount of motion of the lower surface, and this is regulated by the set-screw before described.

Now, my method of feeding the cloth by the joint action of two surfaces may be variously modified without departing from my invention, as the precise method of moving one of the surfaces is unimportant, so long as either surface moved with reference to the other so as to roduce the effect as herein described, the two rasping the cloth by a spring-pressure. These urfaces, moreover, may be arranged in vari- us parts of the machine, and the mechanical evices or trains of apparatus for imparting otion to one of them may be modified or anged in any manner that convenience or ncy may suggest, so long as the surfaces them- lves between which the cloth or material to sewed is grasped act in conjunction with ch other to produce the effects herein de- ribed. These surfaces, acting as described, ay also be applied and used in conjunction ith devices for holding the cloth at rest when cessary, other than the needle itself and the ction of the table, and they may also be used connection with a distinct apparatus for ripping the cloth from the needle.

The precise method of removing one surface om the other, in order to introduce or remove oth, is also unimportant, as one surface may parted from the other in various ways well- own to mechanics, and it will be still my in- ntion so long as one of the surfaces of a feed- g mechanism for a sewing-machine is re- oved from the other substantially in the man- r and for the purposes herein described.

I do not think it needs any demonstration show that my invention attains the end pro- sed. No basting is needed; no baster-plate required. The material must be fed regu- ly, and the stitches consequently of equal ngth, as that depends upon mechanical pre- ion in the construction of the toes, foot, and -screw, or other equivalent devices that may used in place of them; and when the needle in the material the latter may be turned or isted between the feeding-surfaces, thus bending and curving the seam by a motion of the hand of the operator. The stitch as it is formed is, moreover, in plain sight, and defects may be discovered at once.

Having thus described my apparatus, I would state that I do not claim a spring foot or rod serving only the purpose of stripping the material to be sewed off the needle or holding the cloth down to a table as the needle rises, as such a contrivance has been used prior to the date of my invention; but

I do claim as of my own invention—

1. The method of causing the cloth or material to be sewed in a sewing-machine to progress regularly by the joint action of two surfaces between which it is clamped, and which act in conjunction, substantially in the manner and for the purposes herein specified.

2. Holding the cloth or other material at rest by the needle or its equivalent, in combination with the method of causing it to progress regularly, the whole substantially as herein set forth.

3. Arranging feeding-surfaces, substantially such as are herein specified, in such relation to the needle, as herein set forth, that they or one of them shall perform the office of stripping the cloth or material from the needle as it rises or recedes from it, as herein described.

4. So mounting and attaching one of the feeding-surfaces to some other part of the machine that it may be removed or drawn away from the other surface at pleasure, substantially in the manner and to effect the objects herein set forth.

ALLEN B. WILSON.

Witnesses:
B. I. GUY,
JAMES J. GILMORE.